(12) United States Patent
Maekawa

(10) Patent No.: US 11,409,427 B2
(45) Date of Patent: Aug. 9, 2022

(54) DISPLAY CONTROL DEVICE, IMAGE FORMING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Takao Maekawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 199 days.

(21) Appl. No.: 16/435,579

(22) Filed: Jun. 10, 2019

(65) Prior Publication Data

US 2019/0384471 A1    Dec. 19, 2019

(30) Foreign Application Priority Data

Jun. 18, 2018    (JP) .............................. JP2018-115255

(51) Int. Cl.
*G06F 3/0482* (2013.01)
*G06F 3/0485* (2022.01)
*H04N 1/00* (2006.01)

(52) U.S. Cl.
CPC .......... *G06F 3/0485* (2013.01); *G06F 3/0482* (2013.01); *H04N 1/00411* (2013.01); *H04N 1/00413* (2013.01); *H04N 2201/0094* (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 5,317,306 A * | 5/1994 | Abraham | G06F 40/177 345/684 |
| 9,292,188 B2 | 3/2016 | Horiike | |
| 2002/0154157 A1* | 10/2002 | Sherr | H04L 63/12 715/716 |
| 2002/0158898 A1* | 10/2002 | Hsieh | G06F 8/61 715/736 |
| 2006/0277504 A1* | 12/2006 | Zinn | G06F 3/0482 715/864 |
| 2009/0138817 A1* | 5/2009 | Oron | G06F 16/9577 715/788 |
| 2010/0039399 A1* | 2/2010 | Kim | G06F 3/0485 345/173 |

(Continued)

FOREIGN PATENT DOCUMENTS

| | | |
|---|---|---|
| JP | 2006276910 | 10/2006 |
| JP | 2013077239 | 4/2013 |
| JP | 2013114559 | 6/2013 |

OTHER PUBLICATIONS

"Office Action of Japan Counterpart Application" with English translation thereof, dated May 10, 2022, p. 1-6.

*Primary Examiner* — Daniel Rodriguez
(74) *Attorney, Agent, or Firm* — JCIPRNET

(57) ABSTRACT

A display control device includes a reception section that receives a scroll operation on a display screen, a specification section that specifies one or more items designated by a user among plural items displayed on the display screen, and a display control section that, in a case where the one or more designated items reach a reference position on the display screen as a result of scrolling, displays the plural items to be scrollable such that the one or more items are excluded from a scrolling target.

17 Claims, 14 Drawing Sheets

(56) References Cited

U.S. PATENT DOCUMENTS

| | | | |
|---|---|---|---|
| 2010/0205541 A1* | 8/2010 | Rapaport | G06Q 30/02 715/753 |
| 2011/0010669 A1* | 1/2011 | Basu | G06Q 10/10 715/825 |
| 2013/0086522 A1* | 4/2013 | Shimazu | G06F 3/04817 715/810 |
| 2013/0104078 A1* | 4/2013 | Miyazaki | H04N 1/00424 715/833 |
| 2013/0222435 A1* | 8/2013 | Choi | H04M 1/2746 345/684 |
| 2013/0254741 A1* | 9/2013 | Spassov | G06F 8/71 717/121 |
| 2014/0331170 A1* | 11/2014 | Hyun | G06F 3/04842 715/835 |
| 2015/0161674 A1* | 6/2015 | Khoury | G06Q 30/0269 715/764 |
| 2015/0207730 A1* | 7/2015 | Nishina | H04L 67/52 709/217 |
| 2015/0242084 A1* | 8/2015 | Tsukada | G06F 3/0485 715/784 |
| 2015/0277703 A1* | 10/2015 | Davis | G06F 3/04817 705/2 |
| 2015/0301696 A1* | 10/2015 | D' Jesus Bencci | H04L 51/046 715/752 |
| 2015/0324079 A1* | 11/2015 | Kashima | G06F 3/0485 715/784 |
| 2016/0094737 A1* | 3/2016 | Sugiura | H04N 1/00501 358/1.15 |
| 2016/0170576 A1* | 6/2016 | Brown | G06F 3/0485 715/784 |
| 2016/0267056 A1* | 9/2016 | Hertzog | G06F 3/04842 |
| 2018/0181262 A1* | 6/2018 | Beyer | G06F 3/0482 |
| 2018/0225032 A1* | 8/2018 | Jones | G06F 40/166 |
| 2020/0319705 A1* | 10/2020 | Rohrbacher | G06F 3/04842 |
| 2021/0106483 A1* | 4/2021 | Moore | G06F 3/0488 |

* cited by examiner

| | |
|---|---|
| COPIES | 1 |
| PAPER TRAY | AUTO |
| SCALE | 100% |
| DENSITY | NORMAL |
| COLOR MODE | FULL COLOR |
| 2-SIDED | 1-SIDED → 2-SIDED |
| ORIGINAL SIZE | AUTO |
| ORIGINAL IMAGE QUALITY | TEXT |
| STACK/SORT | SORT |
| OUTPUT TRAY | TOP TRAY |
| Nup | 4up |
| BIND | NO |
| PAGE SPLIT | NO |
| ORIGINAL ORIENTATION | READ ORIENTATION |
| SAMPLE COPY | NO |
| ANNOTATION | NO |

DISPLAY CONTROL DEVICE, IMAGE FORMING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-115255 filed Jun. 18, 2018.

BACKGROUND

(i) Technical Field

The present invention relates to a display control device, an image forming apparatus, and a non-transitory computer readable medium storing a program.

(ii) Related Art

In a user interface (hereinafter, referred to as a UI) using a liquid crystal panel as a display device, reception of a user's operation through a touch panel becomes mainstream. Furthermore, in recent years, as design of a UI screen, design in a list format with simplicity and a high list property without a complicated hierarchical structure is becoming popular. In a case where design in a list format is employed, the number of display items on the UI screen increases necessarily. On the other hand, since a size of a display region in the display device to be a display destination of the UI screen is limited, there is a need to confirm all items through a scroll operation.

For example, a user of an image forming apparatus, such as a printer, a scanner, a FAX transmission and reception apparatus, or a multifunction machine having functions thereof needs to confirm or change input system setting, such as an original size, output system setting, such as a paper type and layout designation, while performing a scroll operation prior to starting a job. However, in a case where the number of items to be viewed is large, the confirmation work is not easy.

Accordingly, a technique that assists a confirmation work of an item assuming a scroll operation has been suggested. For example, JP2013-077239A discloses a technique that facilitates confirmation of a setting content by enlarging and highlighting a display size of an item immediately before scrolling outside a display region.

SUMMARY

The larger the number of items to be listed and displayed in a list format, the larger a burden of an operation to store a position of a desired item or forced to scroll to the desired item, and the longer a time needed to find the desired item and confirm the content of the item.

Aspects of non-limiting embodiments of the present disclosure relate to a display control device, an image forming apparatus, and a non-transitory computer readable medium storing a program which provide a technique for assisting a user to ascertain a desired item in a case where a plurality of items are displayed by a scroll operation.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display control device including a reception section that receives a scroll operation on a display screen, a specification section that specifies one or more items designated by a user among a plurality of items displayed on the display screen, and a display control section that, in a case where the one or more designated items reach a reference position on the display screen as a result of scrolling, displays the plurality of items to be scrollable such that the one or more items are excluded from a scrolling target.

BRIEF DESCRIPTION OF THE DRAWINGS

Exemplary embodiment(s) of the present invention will be described in detail based on the following figures, wherein.

DETAILED DESCRIPTION

Figures 1A, 1B:
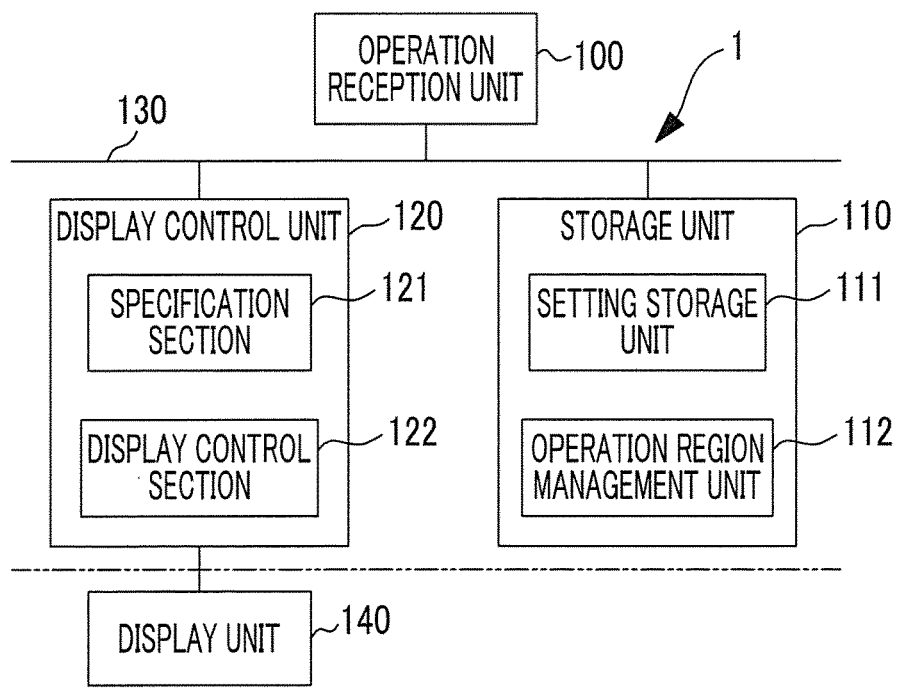
FIG. 1A is a diagram showing a configuration example of a display control device 1 according to a first exemplary embodiment of the present invention.
FIG. 1B is a diagram showing an example of a setting item in an image forming apparatus including the display control device 1.

Hereinafter, exemplary embodiments of the present invention will be described referring to the drawings.

First Exemplary Embodiment

FIG. 1A is a diagram showing an example of the overall configuration of a display control device 1 according to a first exemplary embodiment of the present invention. The display control device 1 is a device that is incorporated in an image forming apparatus, such as a multifunction machine, and performs display control of a UI screen for allowing a user to use the image forming apparatus. As shown in FIG. 1A, the display control device 1 has an operation reception unit 100, a storage unit 110, a display control unit 120, and a bus 130 that mediates data exchange among the constituent elements.

In FIG. 1A, a display unit 140 that displays a UI screen under the control of the display control device 1 is shown along with the display control device 1. The display unit 140 is, for example, a liquid crystal display. As an example of the UI screen that is displayed on the display unit 140, a setting screen on which items corresponding to various settings in the image forming apparatus including the display control device 1 are arranged in a list format is exemplified. In FIG. 1B, among various setting items in the image forming apparatus, setting items on copy are shown. As shown in FIG. 1B, the setting items relating to copy in the exemplary embodiment are 16 types of the number of copies, a paper tray for print, print density, . . . , and annotation; however, the contents or the number of setting items are illustrative.

The operation reception unit 100 is, for example, a transparent pressure sensitive sensor or electrostatic sensor formed in a sheet shape. The operation reception unit 100 adheres to the display unit 140 so as to cover a display region of the display unit 140. The operation reception unit 100 and the display unit 140 form a so-called touch panel under the control of the display control unit 120, and functions as a reception section that receives a user's operation, such as a touch operation or a scroll operation on a display screen. The user of the image forming apparatus including the display control device 1 performs a touch operation on the setting screen displayed in the touch panel, thereby designating a desired item, browsing a setting content corresponding to the designated item, or changing the setting content. The operation reception unit 100 outputs operation content data according to a user's operation content to the display control unit 120. With this, the user's operation content is transferred to the display control unit 120.

Although details are not shown in FIG. 1A, the storage unit 110 includes, for example, a volatile storage unit, such as a random access memory (RAM), and a nonvolatile storage unit, such as a flash memory. In the nonvolatile storage unit, a program that causes the display control unit 120 to execute the display control of the UI screen is stored in advance. The nonvolatile storage unit is used by the display control unit 120 as a work area in executing the program. Furthermore, the nonvolatile storage unit plays the role of a setting storage unit 111 that stores setting data representing the contents of various settings on the image forming apparatus including the display control device 1 and data representing default values (for example, setting contents at the time of factory shipment of the image forming apparatus) on various settings. The volatile storage unit plays the role of an operation region management unit 112 that stores various kinds of data for the display control of the UI screen.

The display control unit 120 is, for example, a central processing unit (CPU). The display control unit 120 operates according to the program stored in the storage unit 110 and performs display control of various UI screens. For example, in a case where operation content data indicating an operation to instruct the display of the setting screen is received from the operation reception unit 100, the display control unit 120 makes the display unit 140 display the setting screen according to setting data stored in the setting storage unit 111.

In the exemplary embodiment, the setting screen is an image in a list format in which plural setting items are arranged in a longitudinal direction (a direction orthogonal to an arrangement direction of text constituting a text string representing a content of an item). For example, in a case where a display instruction of the setting screen on copy is given with an operation on the operation reception unit 100, the display control unit 120 makes the display unit 140 display a setting screen (see FIG. 3) on which items of "copies" to "annotation" shown in FIG. 1B are arranged in the longitudinal direction.

Figure 3:
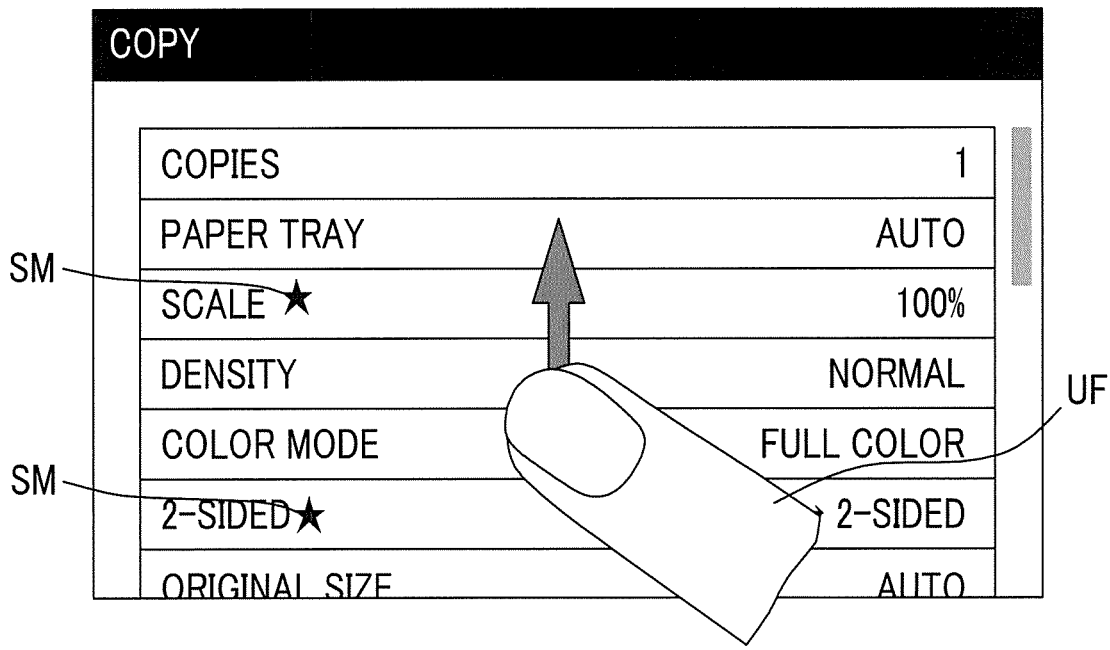
FIG. 3 is a diagram showing an example of scrolling of items in the display control device 1.

The display unit 140 has a limited size of the display region, and is unable to display all setting items relating to copy at one time. For this reason, as shown in FIG. 3, at the time of starting the display of the setting screen, the display control unit 120 of the exemplary embodiment displays items of "copies" to "original size" in the display region of the display unit 140, and displays items after "original image quality" on the display unit 140 according to a user's scroll operation. That is, the display control unit 120 that is operating according to the above-described program makes the display screen of the display unit 140 be scrolled according to a scroll operation (for example, an operation to trace the operation reception unit 100 in an arrow direction in FIG. 3 with a fingertip UF of the user) to the operation reception unit 100.

As shown in FIG. 1A, the display control unit 120 that is operating according to the above-described program functions as a specification section 121 and a display control section 122, and the features of the exemplary embodiment appear at this point. Hereinafter, description will be provided focusing on the specification section 121 and the display control section 122 that prominently exhibit the features of the exemplary embodiment.

The specification section 121 specifies one or more items designated by the user among plural items displayed on the setting screen from the storage contents of the setting storage unit 111 with the start of the display of the setting screen as an opportunity. In the exemplary embodiment, although the specification section 121 refers to the storage contents of the setting storage unit 111 and specifies an item with a setting content changed from a default value by the user as a designated item designated by the user, an item with a setting content browsed by the user may be specified as a designated item. In brief, an item, in which the user has interest, like an item with a setting content browsed or changed by the user may be specified as a designated item. Furthermore, in the exemplary embodiment, although the specification section 121 specifies a designated item with the start of the display of the setting screen an opportunity, each time a setting content is browsed or changed, an item with the setting content browsed or changed may be specified as a designated item. In addition, in a case where user authentication is performed prior to starting the use of the image forming apparatus, a designated item may be specified for each user when the authentication is performed.

In a case where the designated item specified by the specification section 121 reaches a prescribed reference position on the setting screen, the display control section 122 displays plural items to be scrollable such that the designated item is excluded from a scrolling target. In the exemplary embodiment, the reference position is defined by a position based on an end portion of the display screen. In the exemplary embodiment, the setting screen is a screen on which plural items are arranged in the longitudinal direction, and scrolling of the items is performed in the longitudinal direction. For this reason, in the exemplary embodiment, an upper end portion of the setting screen becomes the above-described reference position, and data indicating the reference position is stored in the operation region management unit 112. Note that, in a case where a screen on which plural items are arranged in a lateral direction in a list format is used as a setting screen, since scrolling of the items is performed in a lateral direction (a direction orthogonal to the above-described longitudinal direction, that is, a right-left direction), a left (or right) end portion of the setting screen may become the above-described reference position.

After the number of designated items excluded from a scrolling target has reached a prescribed upper limit value M (where M is a natural number equal to or greater than 1: in the exemplary embodiment, M=1), as a result of scrolling, in a case where a designated item reaching the above-described reference position newly appears, the display control section 122 excludes the newly appeared designated item from a scrolling target and returns a designated item excluded from a scrolling target to a scrolling target such that the upper limit value M is maintained. Note that data indicating the upper limit value M and a counter indicating the number of designated items excluded from a scrolling target are stored in the operation region management unit 112.

Figure 2:
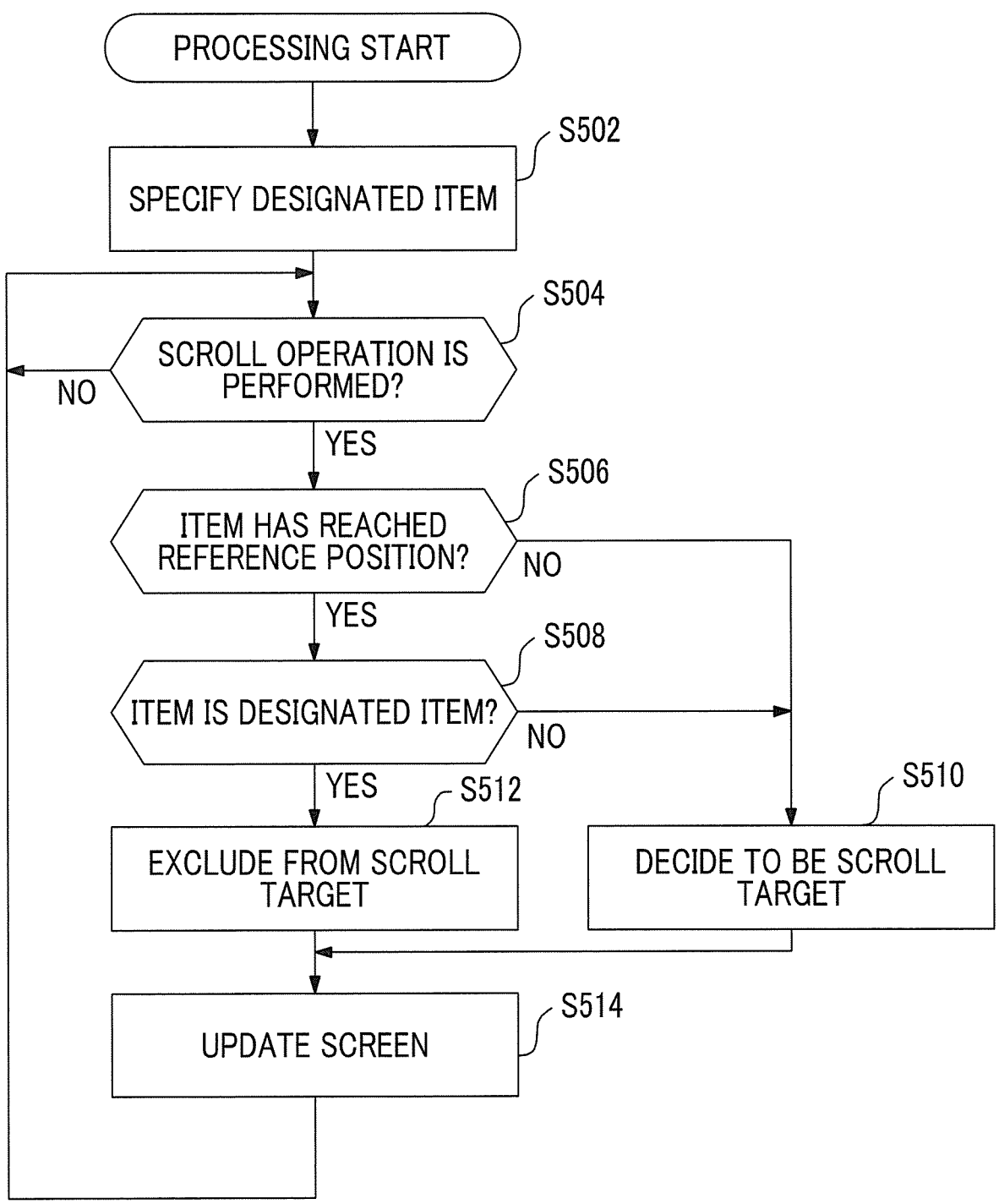
FIG. 2 is a diagram showing an operation example of the display control device 1.

FIG. 2 shows the outline of drawing processing of an item on the setting screen of the display control device 1.

The specification section 121 specifies an item designated by the user (S502). Then, in a case where a user's scroll operation is received (S504: YES), determination is made whether or not a position of an item with a drawing content to be updated reaches the reference position (S506). In a case where the item does not reach the reference position (S506: NO), the item is decided to be a scrolling target (S510). In a case where the item reaches the reference position (S506: YES), determination is made whether or not the item is an item designated by the user (S508). In a case where the item is not a designated item (S506: NO), the item is decided to be a scrolling target (S510). In a case where the item is a designated item (S508: YES), the item is excluded from a scrolling target (S512).

In this way, the display control unit 120 decides whether all items to be drawn are a scrolling target or not (excluded from a scrolling target), and updates the screen based on the decided result (S514).

Hereinafter, an example of drawing processing in the display control device 1 will be specifically described referring to FIGS. 3 to 9 with the setting screen relating to copy as an example.

Note that, in FIGS. 3 to 9 described below, although a star mark SM indicates a designated item for convenience of description and does not need to be actually displayed, the star mark SM may be actually displayed such that the user can distinguish a designated item from other items. In the exemplary embodiment, the designated item is displayed attached with the identification image. Note that providing the star mark as the identification image is merely an example of a method that distinguishes and displays items.

Hereinafter, among the 16 items shown in FIG. 1B, a case where, in regards to four items of "scale", "2-sided", "stack/sort", and "Nup", the setting contents are changed from default setting contents will be described as an example.

As described above, at the time of starting the display of the setting screen relating to copy, as shown in FIG. 3, the display control unit 120 displays the items of "copies" to "original size" in the display region of the display unit 140, and displays the items after "original image quality" on the display unit 140 according to a user's scroll operation. The specification section 121 specifies a designated item with the start of the display of the setting screen as an opportunity. In the operation example, the specification section 121 specifies the four items of "scale", "2-sided", "stack/sort", and "Nup" as designated items. The display control section 122 displays a text string indicating each designated item attached with the above-described identification image (star mark SM) on the setting screen with the specification section 121.

The user who visually recognizes the setting screen shown in FIG. 3 performs an operation to trace the operation reception unit 100 in the arrow direction in FIG. 3 with the fingertip UF, thereby instructing the display control device 1 to scroll the items. In a case where the operation is performed, the operation reception unit 100 delivers operation content data according to the operation to the display control unit 120, and with this, an operation content of the user is transferred to the display control unit 120. The display control unit 120 scrolls items according to the user's operation content.

Figure 4:
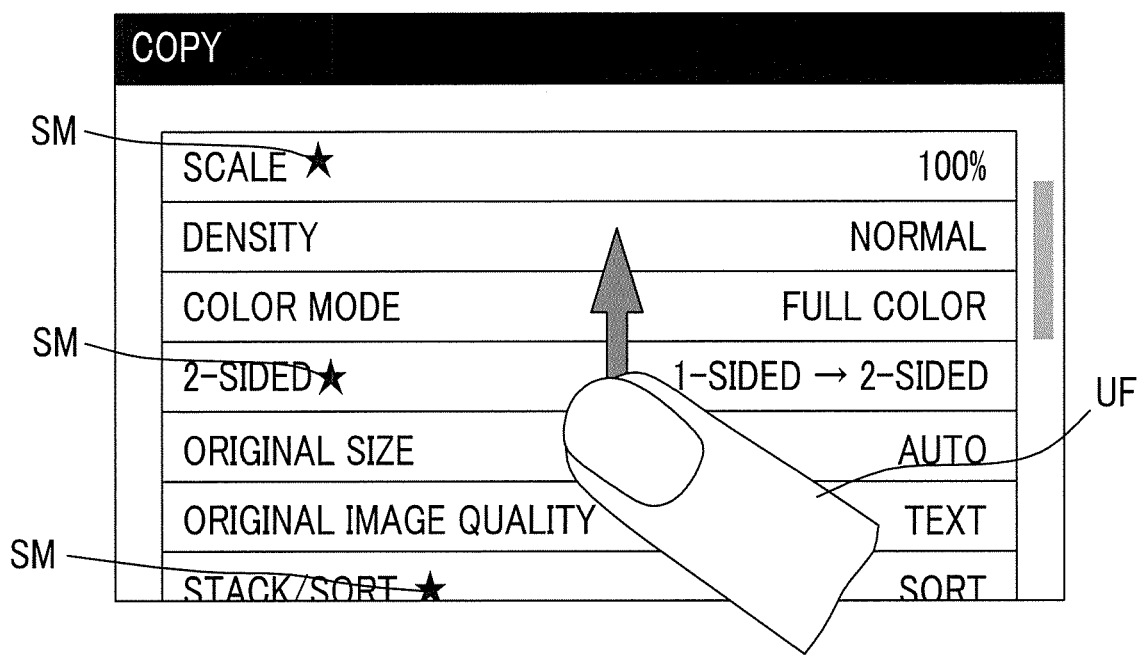
FIG. 4 is a diagram showing an example of scrolling of items in the display control device 1.

As described above, in a case where the designated item specified by the specification section 121 reaches the reference position, the display control section 122 displays plural items to be scrollable such that the designated item is excluded from a scrolling target. Since both items of "copies" and "paper tray" are not designated items, the items are not excluded from a scrolling target and are scrolled outside the display region (see FIG. 4). In contrast, since "scale" is a designated item, as shown in FIG. 4, in a case where "scale" reaches the reference position, the display control section 122 excludes "scale" from a scrolling target and displays plural subsequent items to be scrollable (see FIG. 5).

Figure 5:
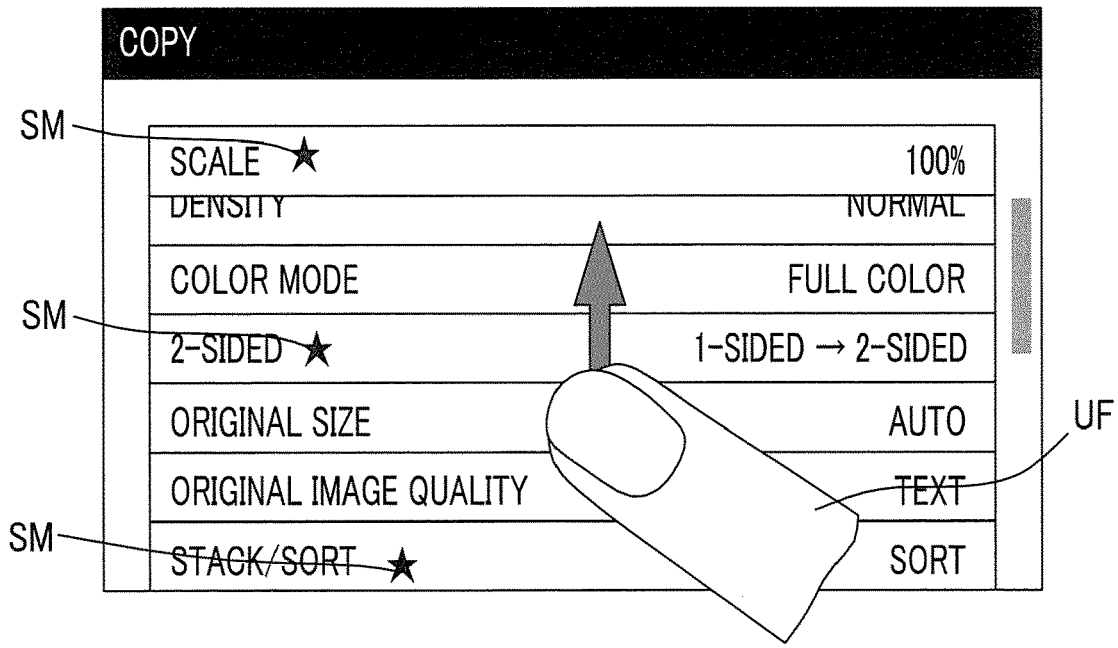
FIG. 5 is a diagram showing an example of scrolling of items in the display control device 1.
Figure 6:
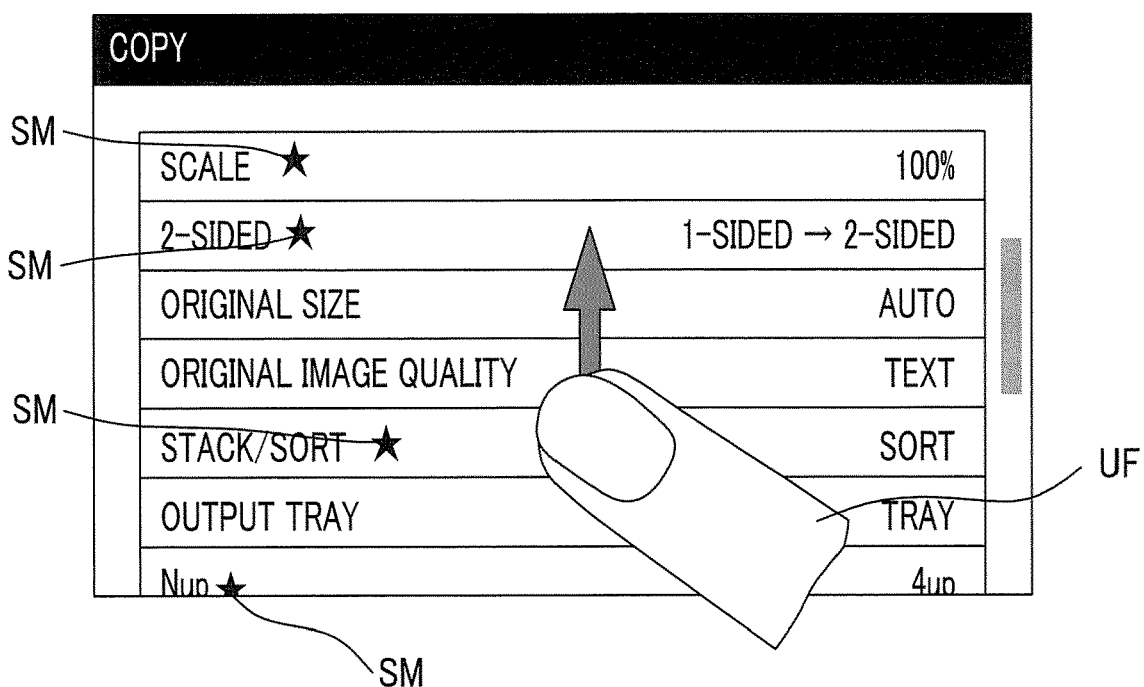
FIG. 6 is a diagram showing an example of scrolling of items in the display control device 1.
Figure 7:
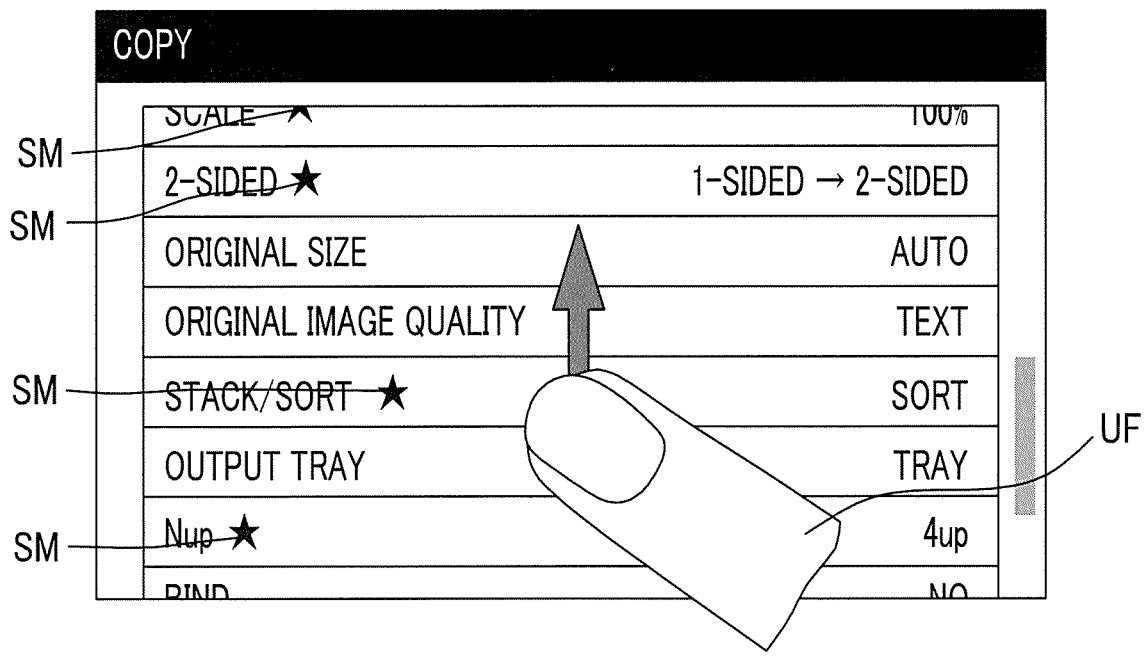
FIG. 7 is a diagram showing an example of scrolling of items in the display control device 1.
Figure 8:
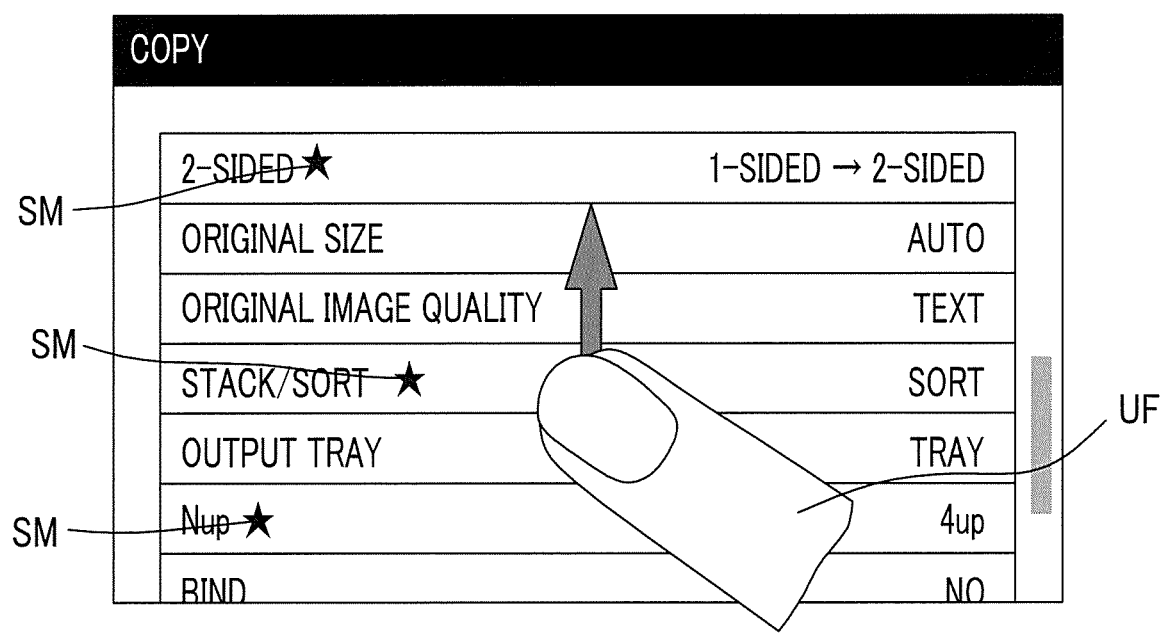
FIG. 8 is a diagram showing an example of scrolling of items in the display control device 1.
Figure 9:
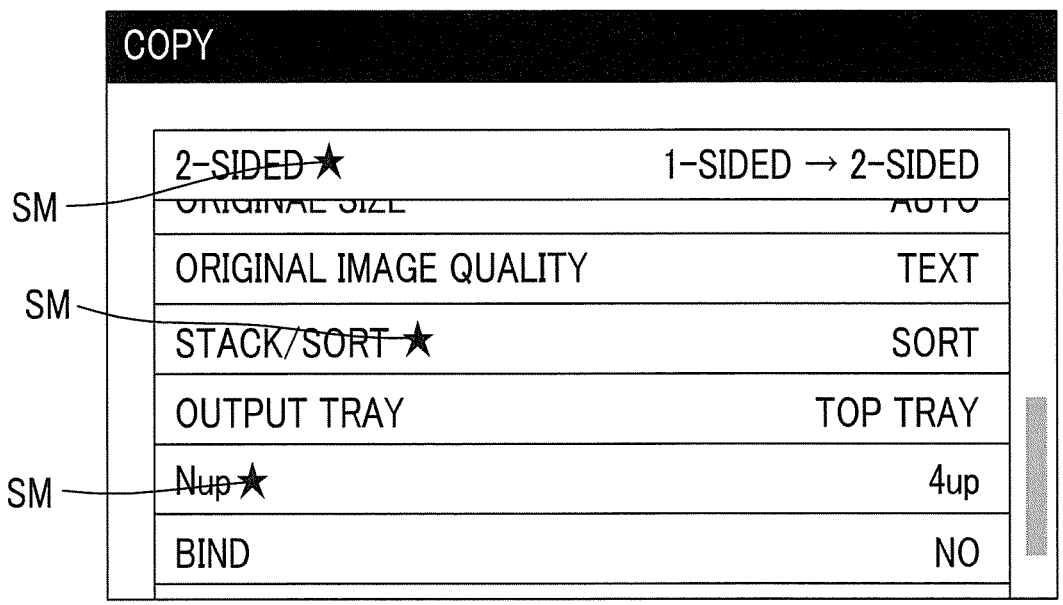
FIG. 9 is a diagram showing an example of scrolling of items in the display control device 1.
Figure 10:
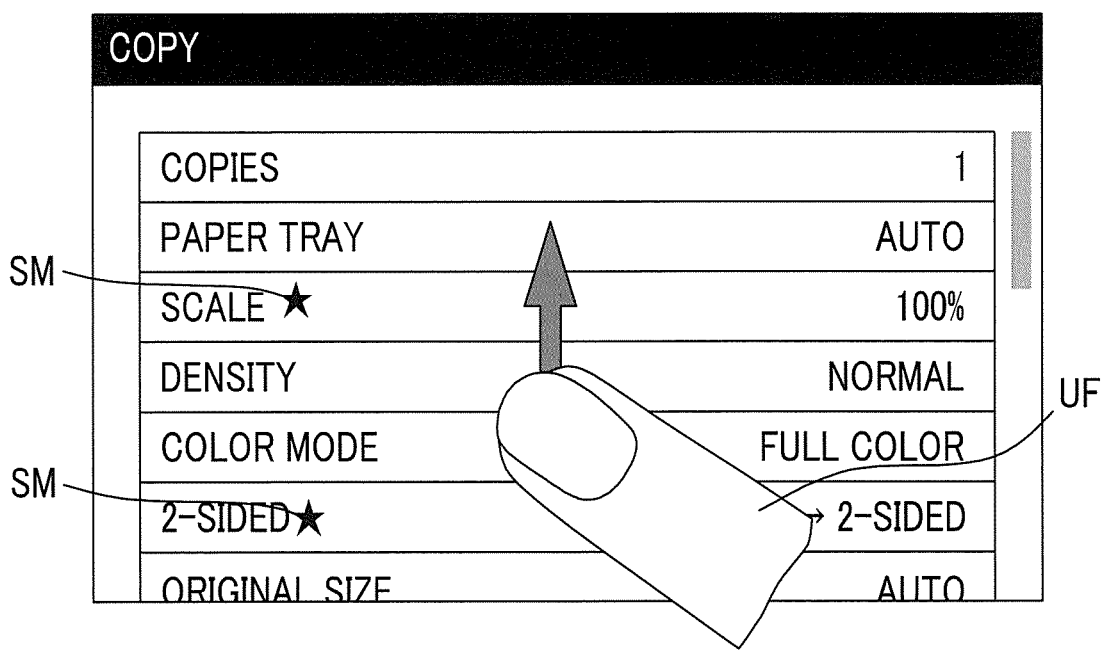
FIG. 10 is a diagram showing an example of scrolling of items in a second exemplary embodiment of the present invention.
Figure 11:
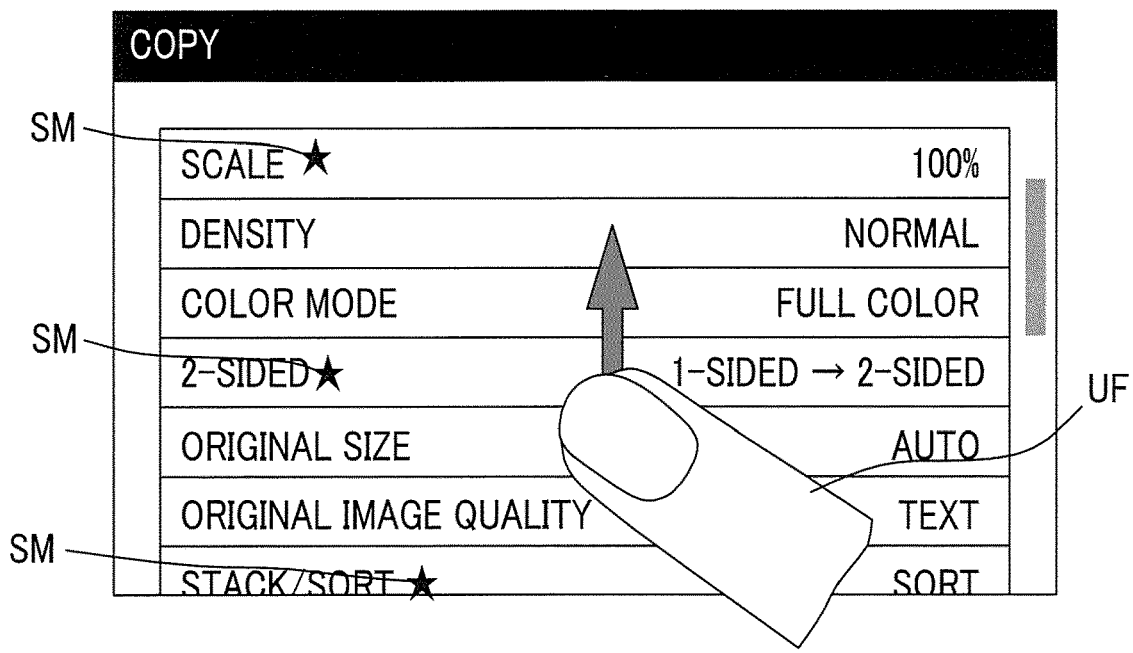
FIG. 11 is a diagram showing an example of scrolling of items in the second exemplary embodiment.
Figure 12:
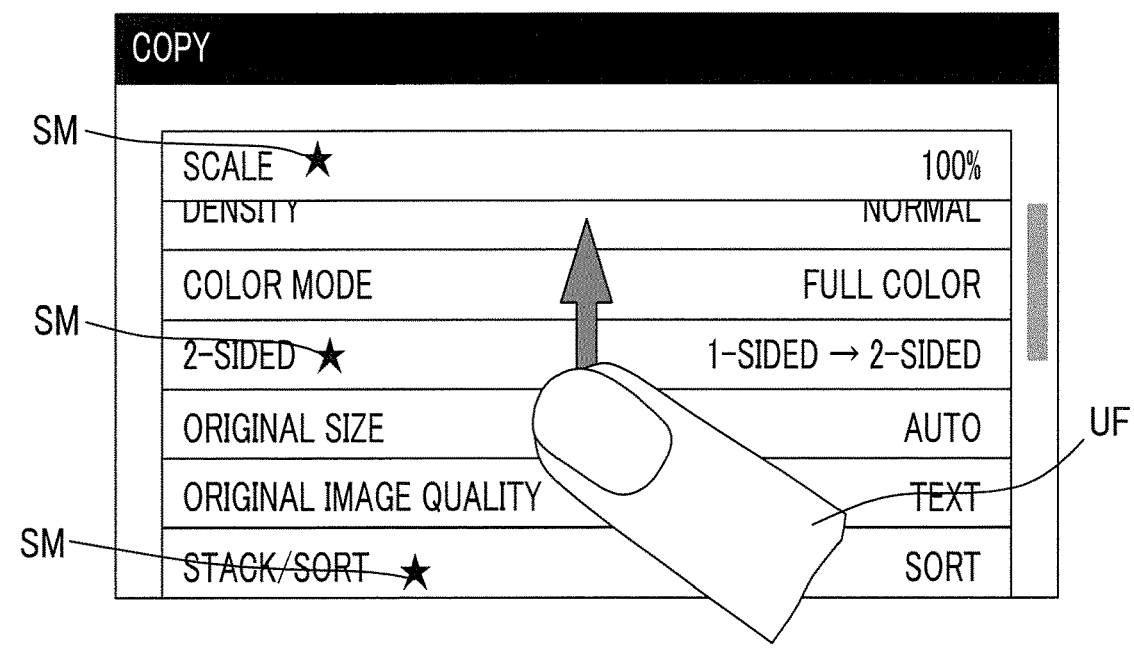
FIG. 12 is a diagram showing an example of scrolling of items in the second exemplary embodiment.
Figure 13:
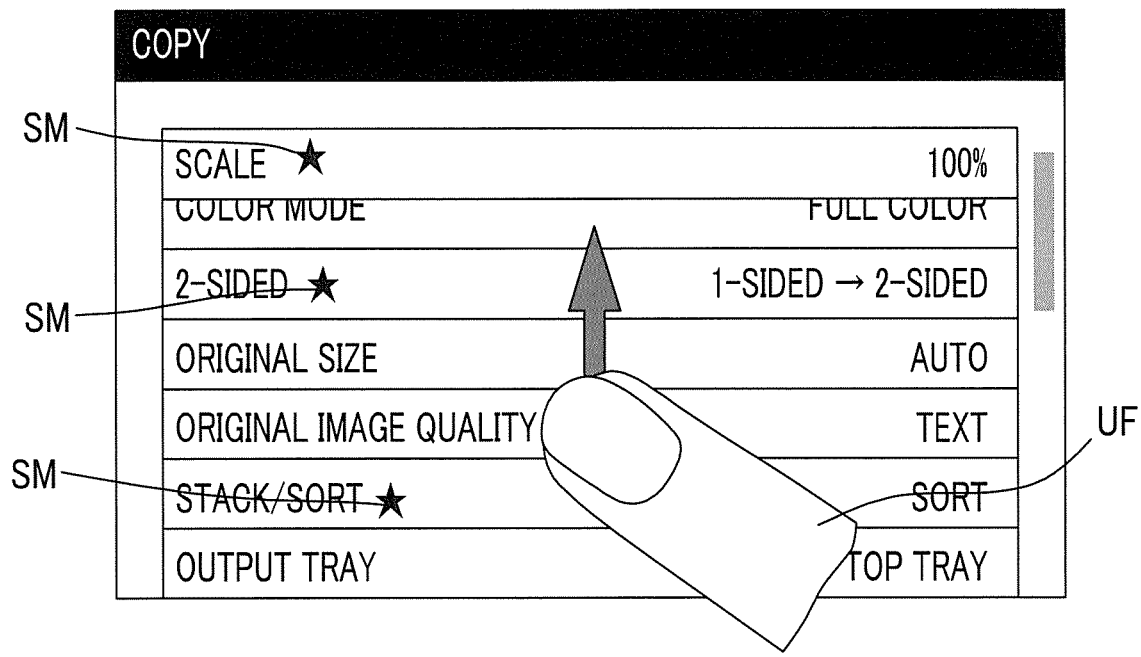
FIG. 13 is a diagram showing an example of scrolling of items in the second exemplary embodiment.
Figure 14:
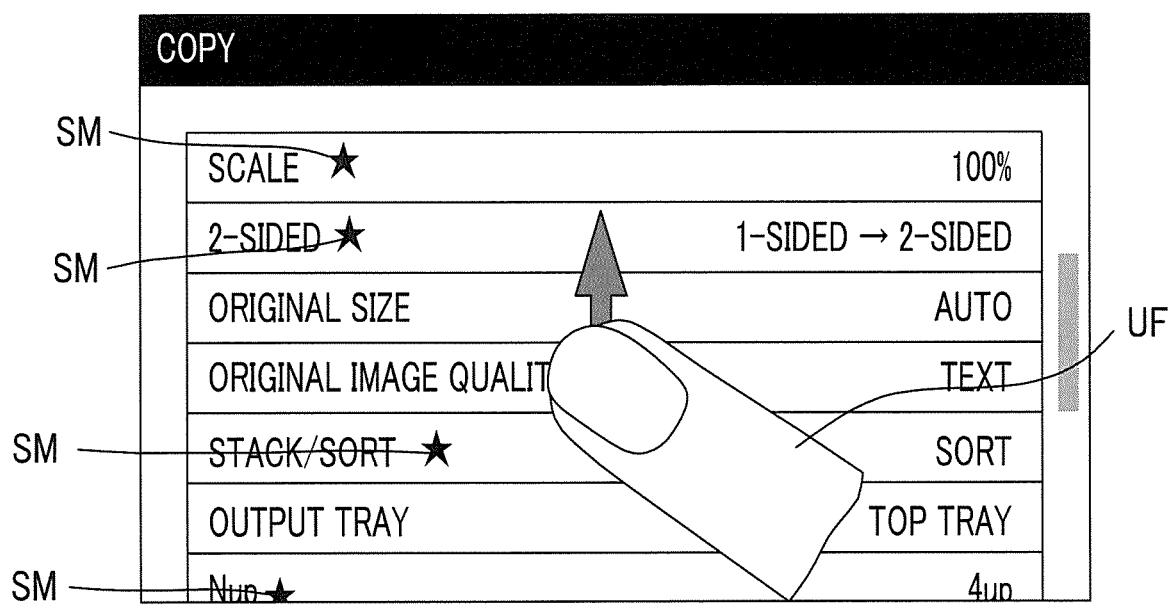
FIG. 14 is a diagram showing an example of scrolling of items in the second exemplary embodiment.
Figure 15:
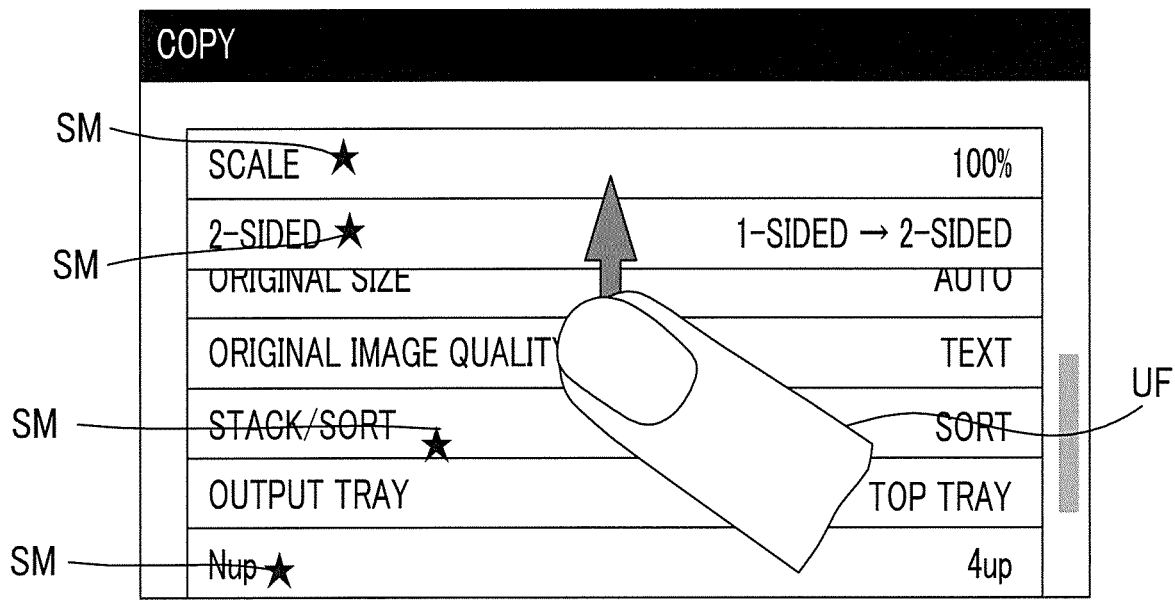
FIG. 15 is a diagram showing an example of scrolling of items in the second exemplary embodiment.
Figure 16:
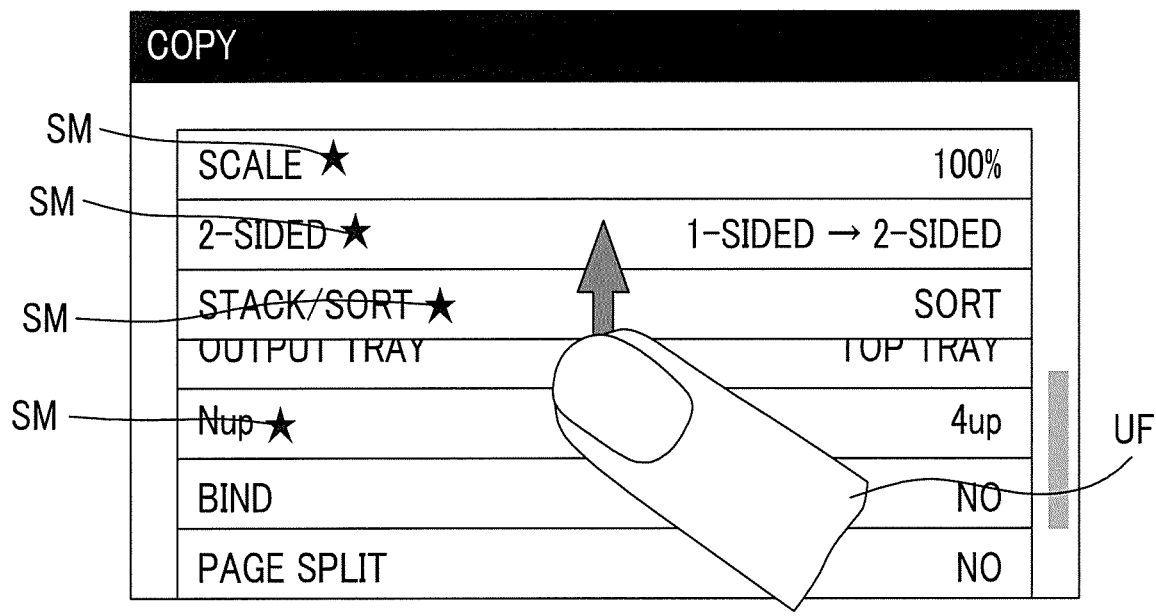
FIG. 16 is a diagram showing an example of scrolling of items in the second exemplary embodiment.

In a case where the user further continues the scroll operation from the state shown in FIG. 5, and as shown in FIG. 6, "2-sided" as the designated item next to "scale" reaches the reference position, the display control section 122 excludes the newly appeared designated item "2-sided" from a scrolling target and returns "scale" as a designated item excluded from a scrolling target at an exclusion timing older than "2-sided" to a scrolling target such that the upper limit value M is maintained (see FIGS. 7 and 8). Subsequently, the display control section 122 excludes the designated item "2-sided" from a scrolling target and continues to display the designated item "2-sided" near the reference position until "stack/sort" as the designated item next to "2-sided" reaches the reference position (see FIG. 9).

As described above, with the display control device 1 of the exemplary embodiment, each of plural designated items designated by the user is excluded from a scrolling target until the next designated item reaches the reference position and continues to be displayed near the reference position. Furthermore, even an item excluded from a scrolling target is returned to a scrolling target again at the timing when the next designated item has reached the reference position.

Second Exemplary Embodiment

In the above-described first exemplary embodiment, although the upper limit value M of the number of designated items to be excluded from a scrolling target is one, the upper limit value M may be of course a natural number equal to or greater than two. Furthermore, in the above-described first exemplary embodiment, although the reference position is defined by the position based on the end portion of the setting screen, the reference position may be defined by the position based on the end portion of the setting screen and the size of each item.

A display control section 122 in the exemplary embodiment executes processing for, with new appearance of an item reaching the reference position as an opportunity as a result of scrolling after the number of items excluded from a scrolling target reaches the prescribed upper limit value M, excluding the newly appeared designated item from a scrolling target and returns designated items excluded from a scrolling target to a scrolling target in an ascending order of an exclusion timing such that the upper limit value M is maintained.

Figure 17:
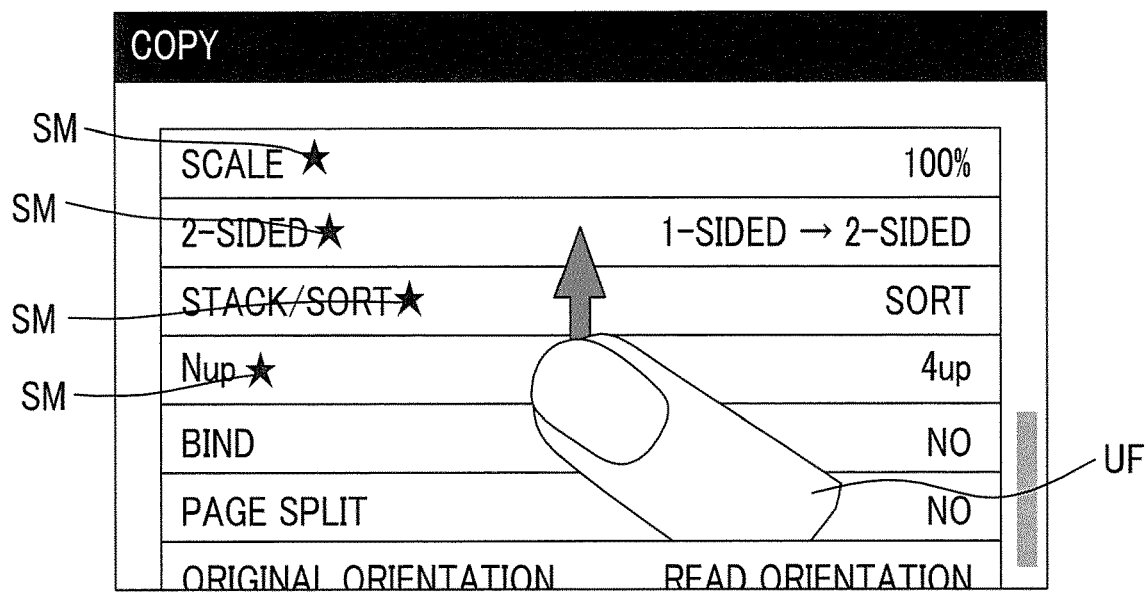
FIG. 17 is a diagram showing an example of scrolling of items in the second exemplary embodiment.
Figure 18:
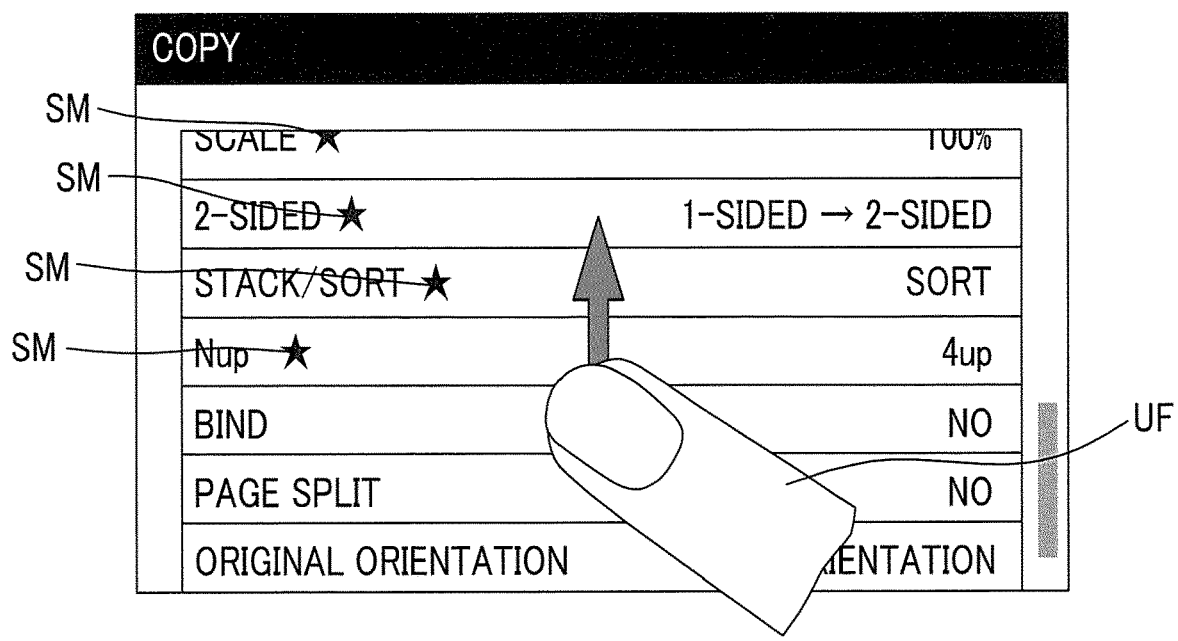
FIG. 18 is a diagram showing an example of scrolling of items in the second exemplary embodiment.
Figure 19:
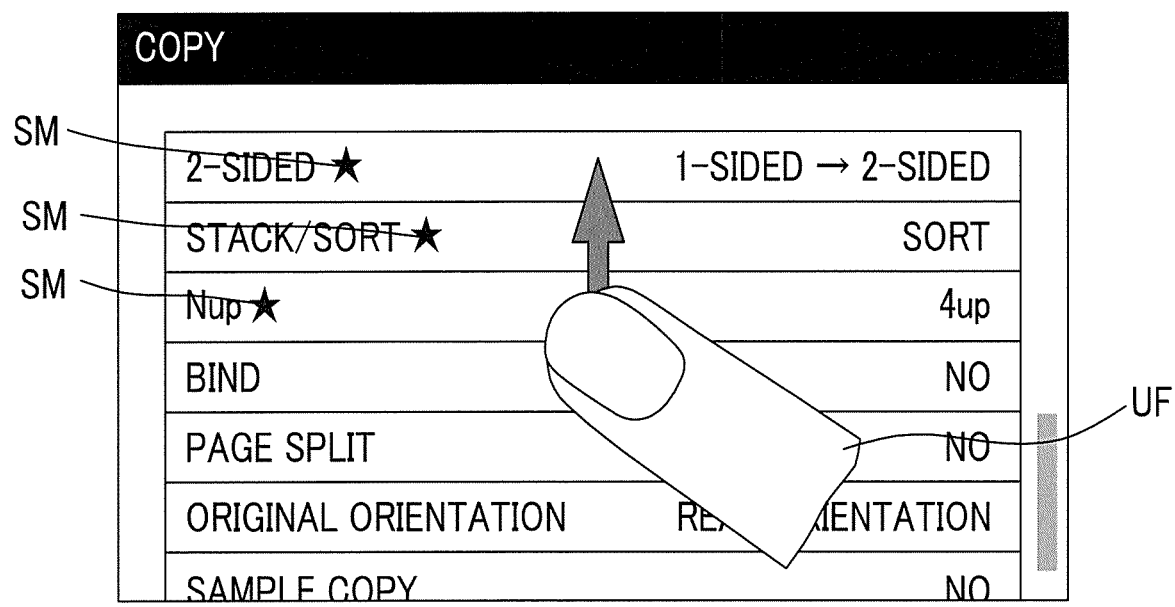
FIG. 19 is a diagram showing an example of scrolling of items in the second exemplary embodiment.
Figure 20:
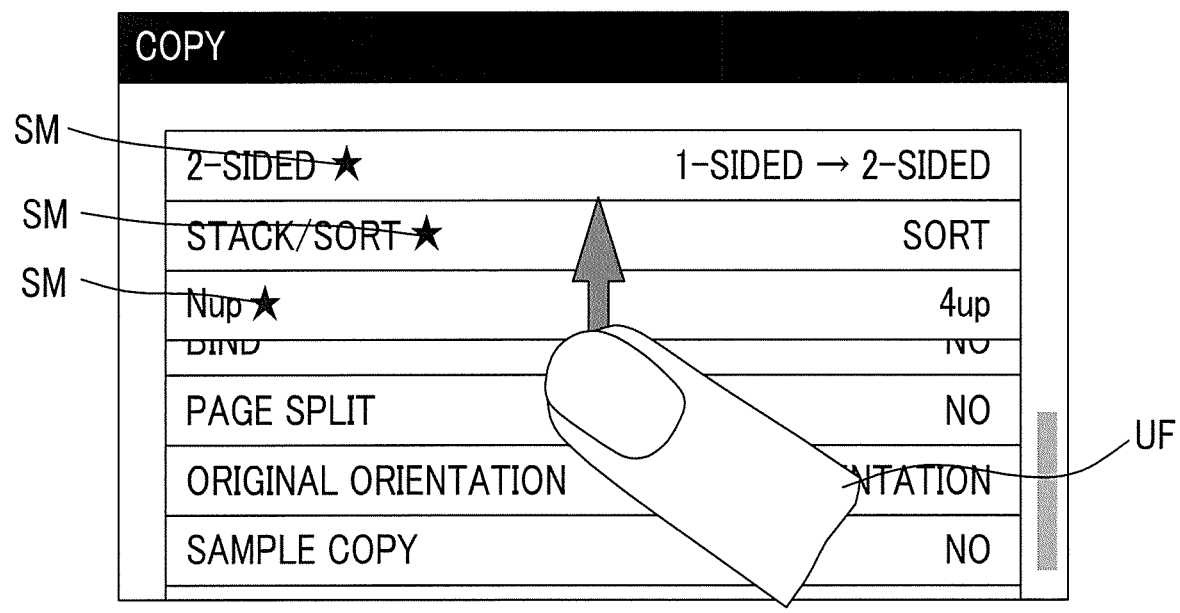
FIG. 20 is a diagram showing an example of scrolling of items in the second exemplary embodiment.

FIGS. 10 to 20 are diagrams showing an operation example of the display control device 1 in a case where the upper limit value M=3. As will be apparent from comparison of screen transition shown in FIGS. 10 to 14 and screen transition shown in FIGS. 3 to 6, an operation until "2-sided" as the designated item next to "scale" reaches the reference position is nearly the same as the operation in the first exemplary embodiment. In the exemplary embodiment, since the upper limit value M=3, the display control section 122 remains "scale" to be excluded from a scrolling target even though the newly appeared designated item "2-sided" reaches the reference position (see FIG. 15), and remains "scale" and "2-sided" to be excluded from a scrolling target even though "stack/sort" as the next designated item reaches the reference position (see FIG. 16). Then, the display control section 122 returns "scale" as the designated item excluded from a scrolling target at the oldest exclusion timing to a scrolling target with the fourth designated item "Nup" reaching the reference position as an opportunity as shown in FIG. 17 (see FIG. 18). Subsequently, the display control section 122 excludes the three designated items of "2-sided", "stack/sort", and "Nup" from a scrolling target and continues to display the three designated items of "2-sided", "stack/sort", and "Nup" near the reference position (see FIGS. 19 and 20).

As described above, according to the exemplary embodiment, a maximum of M designated items are excluded from a scrolling target and continues to be displayed near the reference position. Note that the upper limit value M of the number of items excluded from a scrolling target may be appropriately decided according to the preference of the user of the image forming apparatus including the display control device 1, item visibility, the size of the display region of the display unit 140, and the like. For example, from a viewpoint of preventing adverse effect on visual recognition of items other than designated items, the upper limit value M is, for example, preferably a value (or a value near the value, such as the value+1 or the value−1) of 30 to 50% of the number of items displayable in the longitudinal direction in the display region of the display unit 140 at the maximum.

Third Exemplary Embodiment

In the above-described first and second exemplary embodiments, the specification section 121 specifies an item corresponding to a setting content changed by the user as a designated item (that is, an item to be excluded from a scrolling target). In contrast, the specification section 121 of the exemplary embodiment is different from the specification section 121 in the first and second exemplary embodiments in that the specification section 121 of the exemplary embodiment further receives designation to change one or more items excluded from a scrolling target to a scrolling target.

In more detail, in a case where an operation to change any one of plural items excluded from a scrolling target to a scrolling target is received through the operation reception unit 100, the specification section 121 in the exemplary embodiment returns not only the item but also an item excluded from a scrolling target at an exclusion timing older than the item to a scrolling target. Hereinafter, the operation of the exemplary embodiment will be described in connection with a case where the four items of "scale", "2-sided", "stack/sort", and "Nup" among the setting items (see FIG. 1B) relating to copy are designated items specified by the specification section 121, and as shown in FIG. 21, the four designated items are excluded from a scrolling target and displayed (that is, in a case where the upper limit value M=4).

Figures 21, 22:
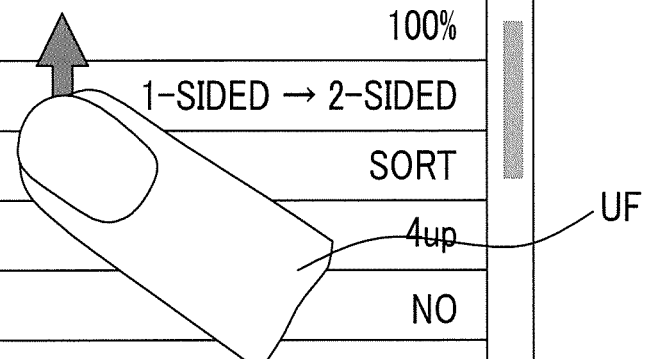
FIG. 21 is a diagram showing an example of scrolling of items in a third exemplary embodiment of the present invention.
FIG. 22 is a diagram showing an example of scrolling of items in the third exemplary embodiment.
Figure 23:
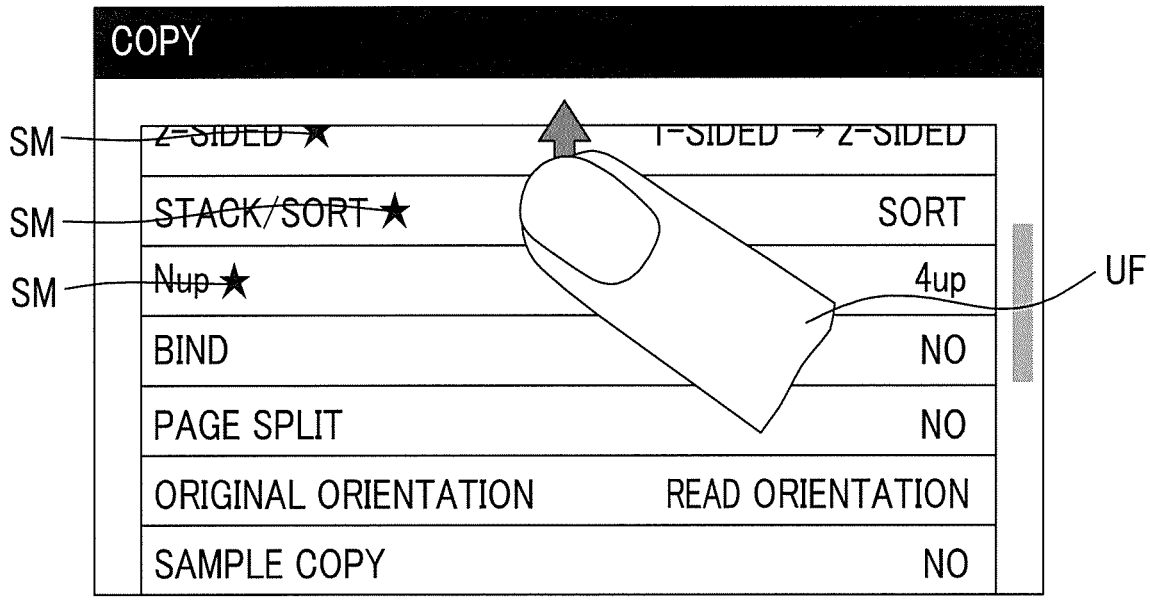
FIG. 23 is a diagram showing an example of scrolling of items in the third exemplary embodiment.
Figure 24:
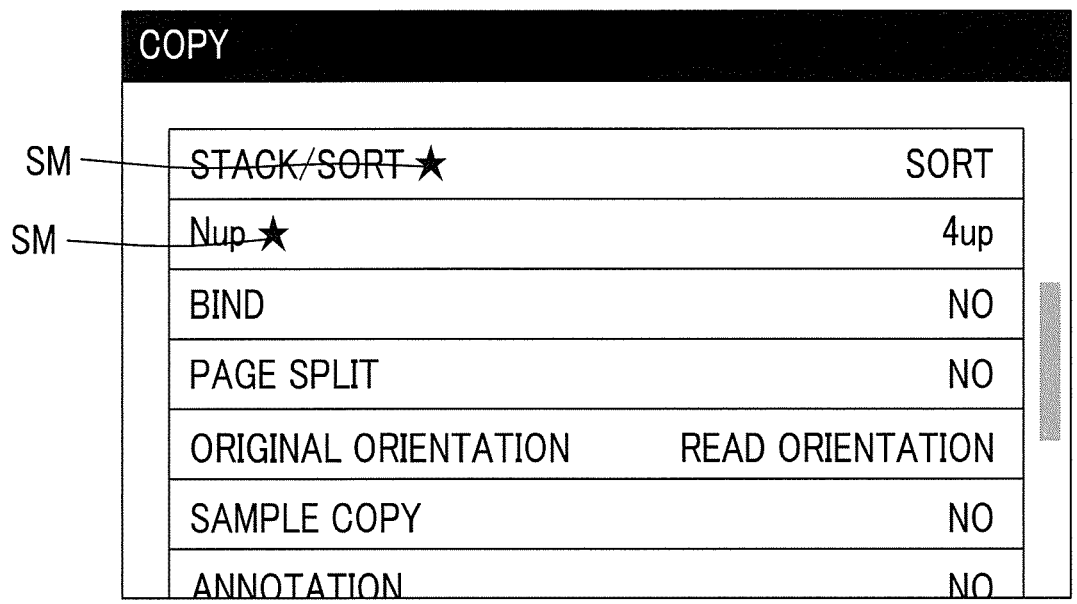
FIG. 24 is a diagram showing an example of scrolling of items in the third exemplary embodiment.

It is assumed that, in a state in which a setting screen shown in FIG. 21 is displayed on the display unit 140, the user performs an operation (as shown in FIG. 22, an operation to scroll the designated item "2-sided" upward) to return "2-sided" to a scrolling target on the operation reception unit 100. The operation content of the user is transferred from the operation reception unit 100 to the display control unit 120, and the display control section 122 returns not only the designated item "2-sided" designated to be returned to a scrolling target but also the designated item "scale" excluded from a scrolling target at an exclusion timing older than the item to a scrolling target. As a result, as shown in FIGS. 23 and 24, the designated items "scale" and "2-sided" are scrolled outside the display region of the display unit 140.

As described above, even with the exemplary embodiment, as in the first exemplary embodiment, each of plural designated items designated by the user is excluded from a scrolling target until the next designated item reaches the reference position and continues to be displayed near the reference position. Accordingly, even with the exemplary embodiment, the same effects as the above-described first exemplary embodiment are obtained. Note that, in the exemplary embodiment, although not only an item designated to be returned to a scrolling target but also an item excluded from a scrolling target at an exclusion timing older than the designated item are returned to a scrolling target, an aspect may be of course made in which only a designated item may be returned to a scrolling target.

Modifications

Although the first, second, and third exemplary embodiments of the present invention have been described above, the exemplary embodiments may be modified as modification examples described below. Furthermore, plural modification examples may be combined.

MODIFICATION EXAMPLE 1

The storage unit 110 may play a role of a storage section that stores a history of an operation of a user, the display control unit 120 may function as an identification section that identifies the user, in addition to the specification section 121 and the display control section 122, and the specification section 121 may execute processing for specifying one or more designated items based on a history of an operation of the user identified by the identification section. Furthermore, the display control unit 120 may execute processing for invalidating a designated item for which a prescribed time has elapsed after specification with the specification section 121 (that is, returning the designated item to a scrolling target).

MODIFICATION EXAMPLE 2

As in the above-described second exemplary embodiment, in an aspect in which a position according to a longitudinal width for M items (where M is a natural number equal to or greater than two) from the end portion (edge) of the setting screen is set as the reference position, the items may be resized and a number of items greater than M may be displayed in a region (hereinafter, referred to as a lock region) from the end portion of the setting screen to the reference position. Specifically, as a result of scrolling, in a case where an item reaching the reference position newly appears, the display control section 122 may execute processing for adding the newly appeared item as an item to be excluded from a scrolling target and resizing (for example, ½ in the longitudinal direction) and displaying plural items to be excluded from a scrolling target such that items already excluded from a scrolling target and the added item fall within the lock region.

As in the above-described exemplary embodiments, in a case where each item is a rectangle having short sides and long sides, the long sides may be made short (for example, ⅓ or the like) while maintaining the length of the short sides (the sides in the longitudinal direction) so as to enable the item to be discriminated even after resizing, and plural items may be displayed in parallel in the lateral direction in a region for one item before resizing. Furthermore, the resized item may have a higher reduction ratio as an exclusion timing from a scrolling target is older. For example, in a case where the upper limit value M=4, an aspect is considered in which an item excluded from a scrolling target at the earliest exclusion timing and an item excluded at the second earliest exclusion timing are displayed in parallel in the lateral direction by reducing the long sides to ½, and items excluded at the third and fourth earliest exclusion timings are displayed without resizing. This is because it is considered that the user more sufficiently ascertains the setting content of an item excluded from a scrolling target at an older timing.

Figure 25:
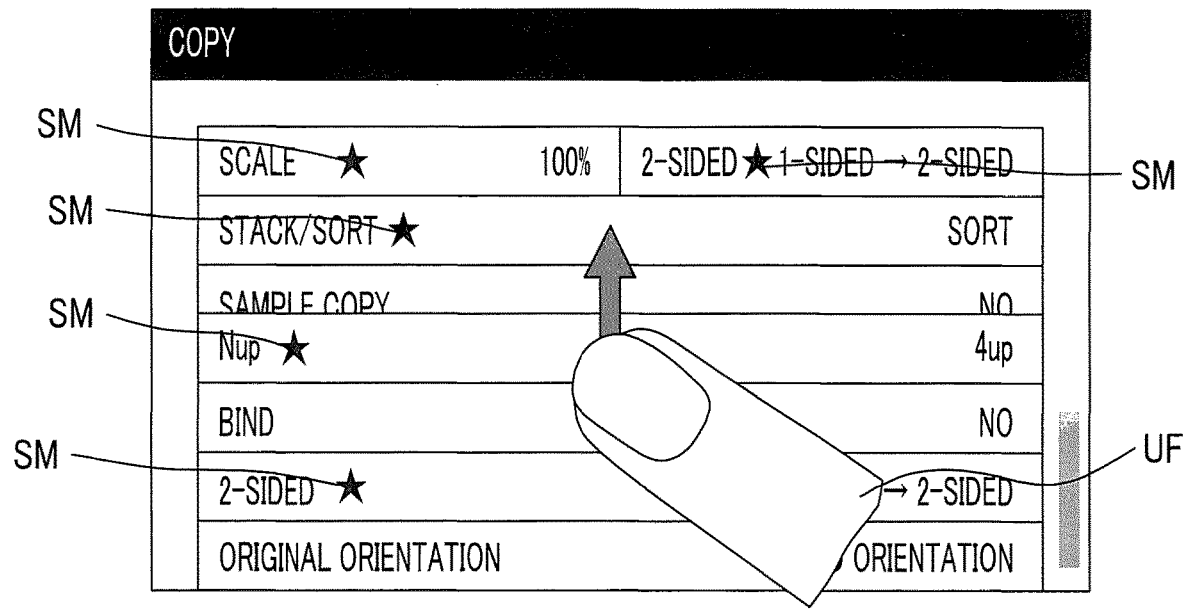
FIG. 25 is a diagram showing an example of scrolling of items in a modification example.
Figure 26:
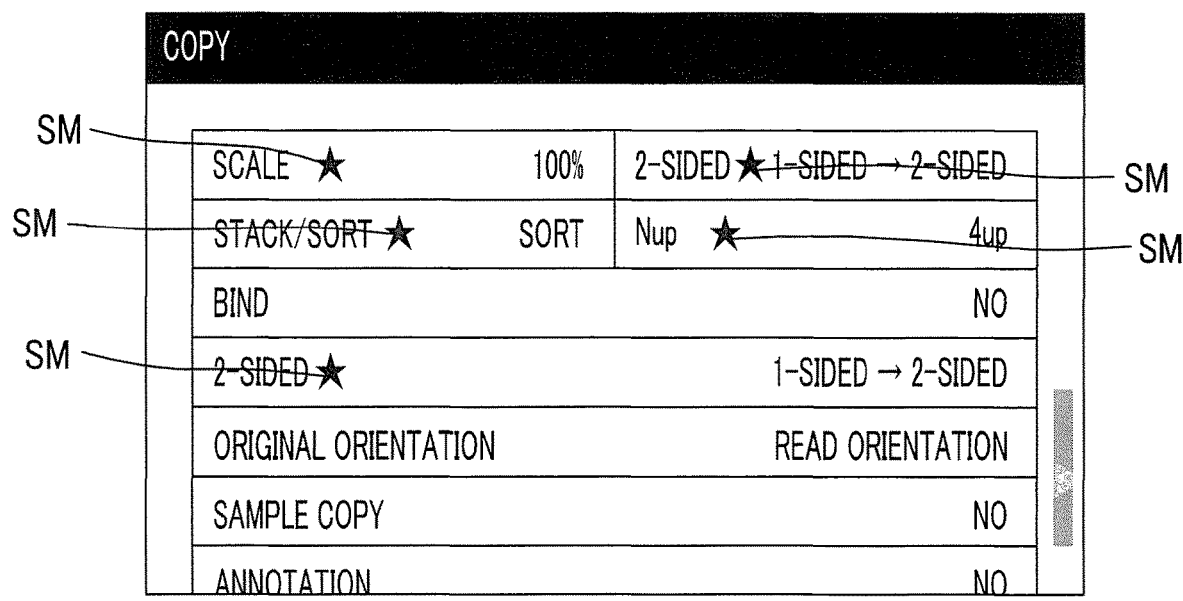
FIG. 26 is a diagram showing an example of scrolling of items in the modification example.

For example, an example shown in FIGS. 25 and 26 is a case where the lock region has a size for two items, and a maximum value of the number of items displayable in the lock region is set to four. As shown in FIG. 25, in a case where three items are displayed in the lock region, an item displayed in advance is reduced in lateral width to ½ and displayed. With the resizing, while an item name and a setting content cannot be sufficiently displayed, the item name and/or the setting content may be partially omitted and displayed.

In a case where a new item to be displayed in a lock region appears from the state of FIG. 25 with a scroll operation, as shown in FIG. 26, an item that is not resized is resized, and the new item is reduced to ½ and displayed in the lock region.

MODIFICATION EXAMPLE 3

In the above-described exemplary embodiments, although an application example of the present invention to the display control of the UI screen in the image forming apparatus has been described, the display control device according to the exemplary embodiments of the present invention may be incorporated in a portable information terminal, such as a smartphone or a tablet terminal, and the present invention may be applied to display control of a UI screen in the portable information terminal.

MODIFICATION EXAMPLE 4

In the above-described exemplary embodiments, although an example where the reception section, the specification section 121, and the display control section 122 are implemented by software has been described, one or all of the sections may be implemented by a hardware circuit. This software may be provided in a form of being recorded in a computer readable recording medium, such as an optical recording medium or a semiconductor memory, and the software may be read from the recording medium and installed. Furthermore, this software may be provided through a telecommunication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising at least one hardware processor configured to implement:

a reception section that receives a scroll operation on a display screen;

a specification section that specifies one or more items designated by a user among a plurality of items displayed on the display screen;

a display control section that, in a case where the one or more designated items reach a definite reference position on the display screen as a result of scrolling, displays the plurality of items to be scrollable such that the one or more items are excluded from a scrolling target in a list, and the items excluded from a scrolling target are displayed on the same list as the scrolling target; and wherein the specification section further receives designation to change one or more items excluded from a scrolling target to the scrolling target with a scroll operation that scroll the items excluded from a scrolling target in a direction along the scrolling target moving toward the definite reference position from a state where items that belong to the scrolling target and the items excluded from a scrolling target are displayed in the same list.

2. The display control device according to claim 1, wherein the specification section specifies an item corresponding to a setting content browsed by the user.

3. The display control device according to claim 1, wherein the specification section specifies an item corresponding to a setting content changed by the user.

4. The display control device according to claim 1, wherein the reference position is defined by a position based on an end portion of the display screen.

5. The display control device according to claim 4, wherein the reference position is further defined by a size of each item.

6. The display control device according to claim 2, wherein the reference position is further defined by a size of each item.

7. The display control device according to claim 3, wherein the reference position is further defined by a size of each item.

8. The display control device according to claim 1, wherein, in a case where an item reaching the reference position newly appears as a result of scrolling after a number of items excluded from a scrolling target has reached a prescribed upper limit value, the newly appeared item is excluded from a scrolling target and the items excluded from a scrolling target are returned to a scrolling target in an ascending order of an exclusion timing such that the upper limit value is maintained.

9. The display control device according to claim 2, wherein, in a case where an item reaching the reference position newly appears as a result of scrolling after a number of items excluded from a scrolling target has reached a prescribed upper limit value, the newly appeared item is excluded from a scrolling target and the items excluded from a scrolling target are returned to a scrolling target in an ascending order of an exclusion timing such that the upper limit value is maintained.

10. The display control device according to claim 1, wherein the reference position is defined as a prescribed region in the display screen, and
in a case where an item reaching the reference position newly appears as a result of scrolling, the display control section adds the newly appeared item as an item to be excluded from a scrolling target, and resizes and displays one or more items to be excluded from a scrolling target such that an item already excluded from a scrolling target and the added item fall within the region.

11. The display control device according to claim 10, wherein each item is a rectangle having short sides and long sides, and
the resizing is performed by making the long sides short while maintaining the short sides.

12. The display control device according to claim 11, wherein the resized item has a higher reduction ratio as an exclusion timing is older.

13. The display control device according to claim 1, wherein, in a case where designation to change one item included in a plurality of items excluded from a scrolling target to the scrolling target is received, the specification section returns not only the designated item but also an item excluded from a scrolling target at an exclusion timing older than the designated item to a scrolling target.

14. The display control device according to claim 1, further comprising:
a storage section that stores a history of an operation of each user; and
an identification section that identifies the user,
wherein the specification section specifies an item based on a history of an operation of the identified user.

15. The display control device according to claim 1, wherein the specification section invalidates the specified one or more items in a case where a prescribed time has elapsed after the one or more items are specified with the specification section.

16. An image forming apparatus comprising:
an image processing unit;
the display control device according to claim 1; and
the display screen,
wherein the plurality of items relate to image processing.

17. A non-transitory computer readable medium storing a program that causes a computer to function as:
a reception section that receives a scroll operation on a display screen;
a specification section that specifies one or more items designated by a user among a plurality of items displayed on the display screen; and
a display control section that, in a case where the one or more designated items reach a definite reference position on the display screen as a result of scrolling, displays the plurality of items to be scrollable such that the one or more items are excluded from a scrolling target in a list, and the items excluded from a scrolling target are displayed on the same list as the scrolling target; and
wherein the specification section further receives designation to change one or more items excluded from a scrolling target to the scrolling target with a scroll operation that scroll the items excluded from a scrolling target in a direction along the scrolling target moving toward the definite reference position from a state where items that belong to the scrolling target and the items excluded from a scrolling target are displayed in the same list.

* * * * *